United States Patent [19]
Bergeron

[11] Patent Number: 5,644,854
[45] Date of Patent: Jul. 8, 1997

[54] MEASURING DEVICE FOR VEHICLE BODY REPAIR

[76] Inventor: Marcel J. Bergeron, 288 Rang St-Edouard, Iberville, Québec, Canada, J2X 4J3

[21] Appl. No.: 246,784

[22] Filed: May 20, 1994

[51] Int. Cl.$^6$ .......................... G01B 11/03; G01B 5/004
[52] U.S. Cl. ................................. 33/608; 33/288
[58] Field of Search ...................... 33/608, 288, DIG. 21

[56] References Cited

U.S. PATENT DOCUMENTS

| | | | |
|---|---|---|---|
| 4,513,508 | 4/1985 | Jarman et al. | 33/288 |
| 4,598,481 | 7/1986 | Donahue | 33/288 |
| 4,691,443 | 9/1987 | Hamilton et al. | 33/288 |
| 4,922,623 | 5/1990 | Aldrich et al. | 33/608 |
| 5,029,397 | 7/1991 | Palombi | 33/288 |
| 5,515,613 | 5/1996 | Hinson | 33/288 |
| 5,522,145 | 6/1996 | Chisum | 33/608 |

Primary Examiner—Christopher W. Fulton
Attorney, Agent, or Firm—François Martineau

[57] ABSTRACT

A first upright frame, to be disposed alongside a vehicle body to be repaired, has a top horizontal rail and a bottom horizontal measuring bar; a vertical, travelling, measuring rail is suspended from a carriage moving on the top rail for horizontal movement, a laser carriage is guided for vertical movement on the vertical travelling rail, a laser support is rotatably secured to the laser carriage for movement in a vertical plane, a cylindrical laser is supported by the support for rotation about its longitudinal axis. The laser has a lateral slit at one end through which a diverging planar laser beam is emitted. A vertical measuring tape is carried by the travelling rail and can be longitudinally adjusted while a horizontal measuring tape is longitudinally adjusted on the horizontal measuring bar. The laser can be positioned anywhere in a plane normal to an imaginary horizontal datum plane determined by targets underneath the vehicle. The laser beam can be directed towards the vehicle either as a horizontal or a vertical linear ray and the laser beam, when illuminating a specific zone of the vehicle, can be rotated to illuminate a graduation of the vertical measuring rail when the beam is horizontal or a graduation of the horizontal measuring bar when the beam is vertical. Therefore, specific areas of the vehicle can be directly measured as right angular coordinates of a selected reference point on the datum plane.

18 Claims, 10 Drawing Sheets

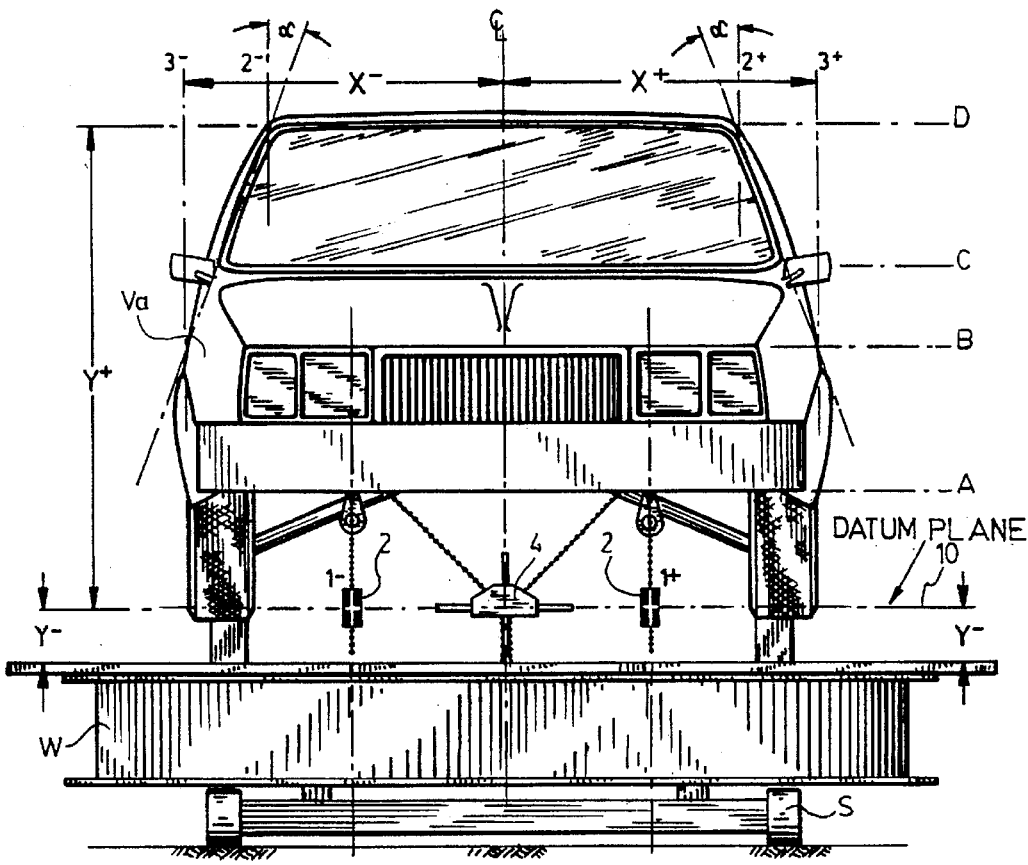

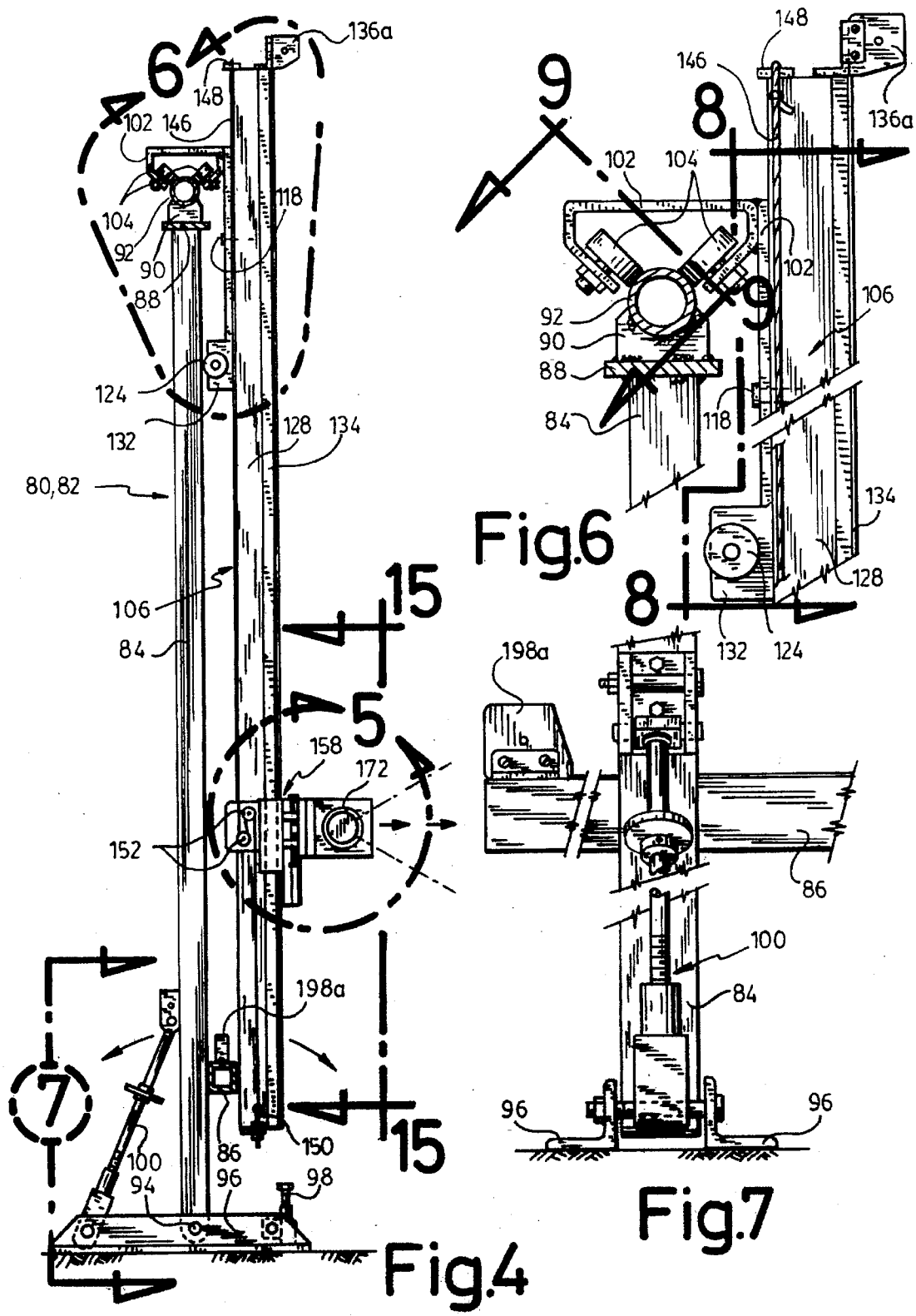

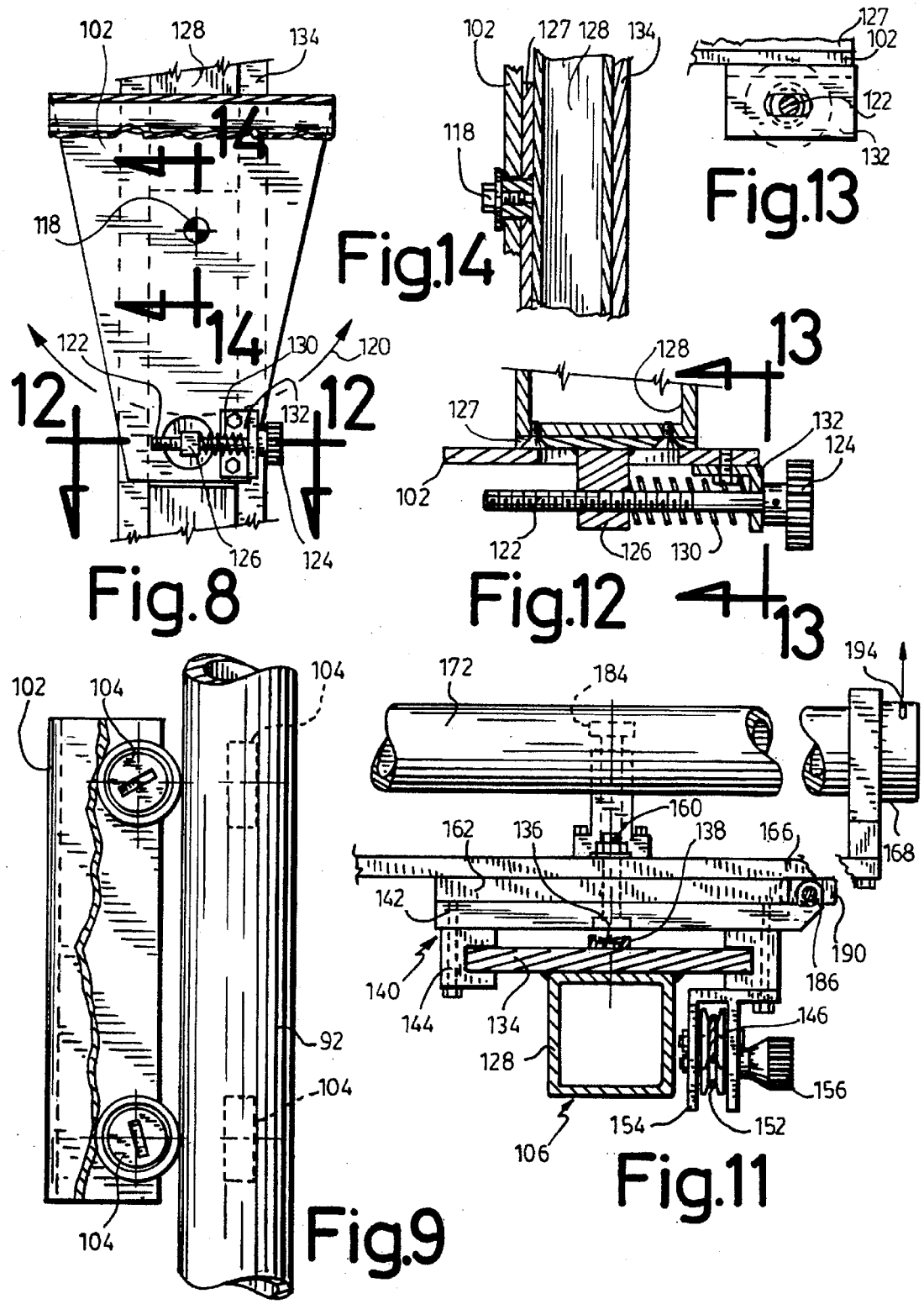

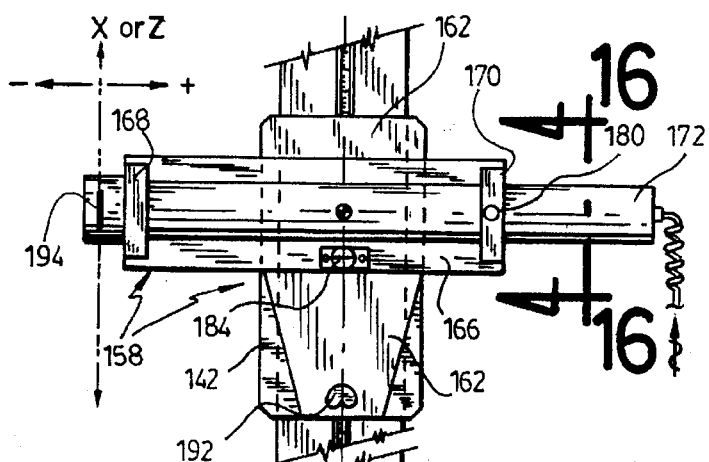
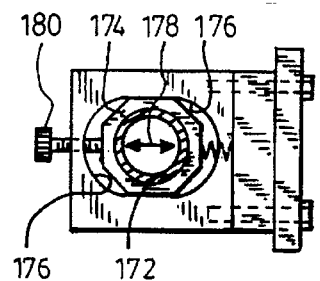
Fig.15
Fig.16
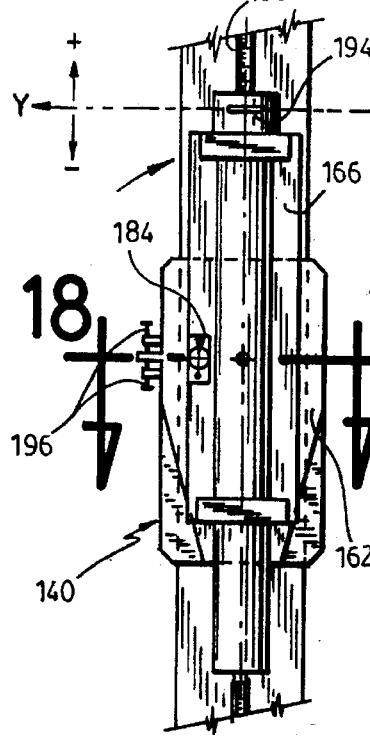
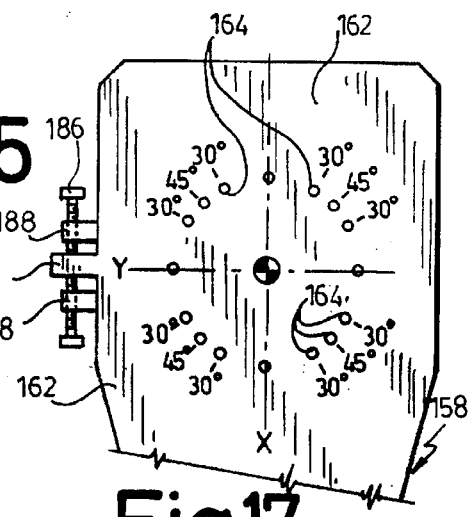
Fig.17
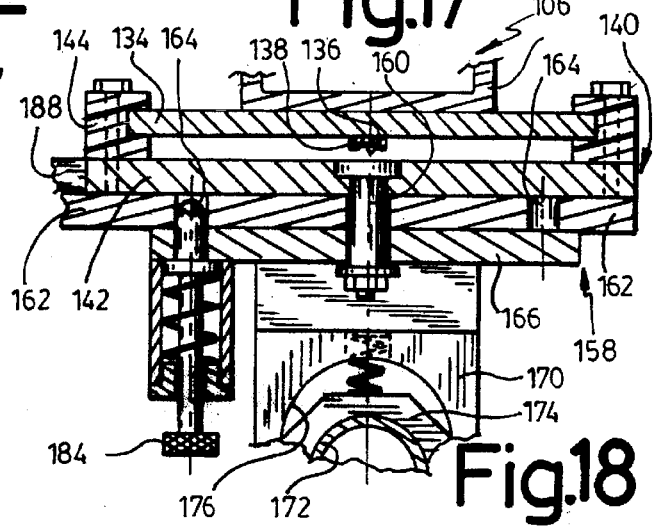
Fig.15a
Fig.18

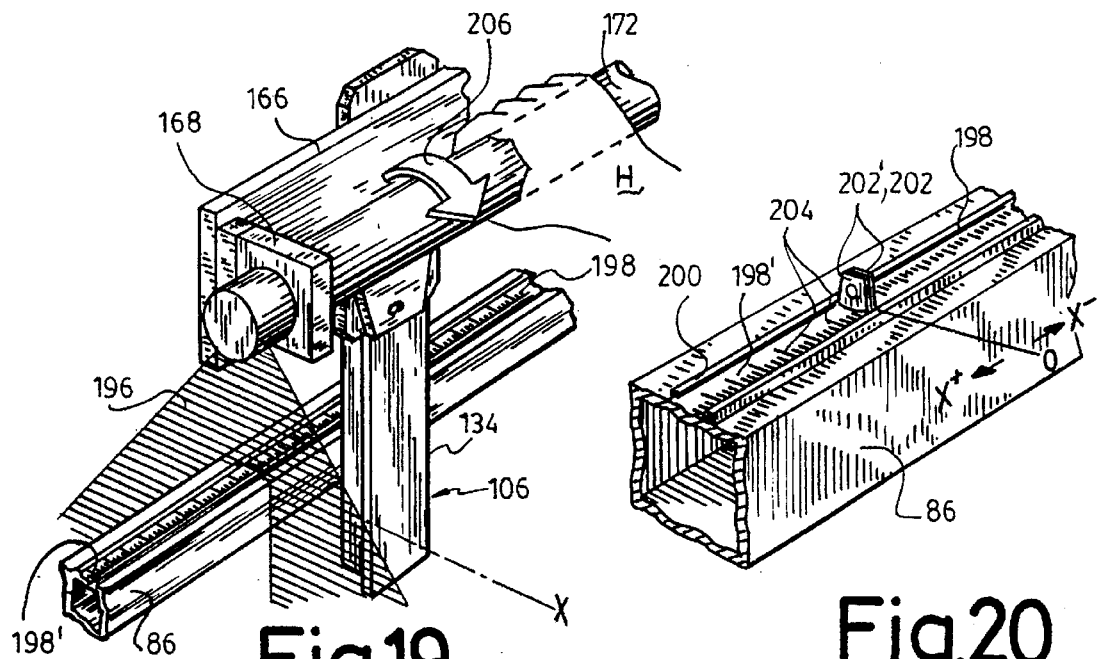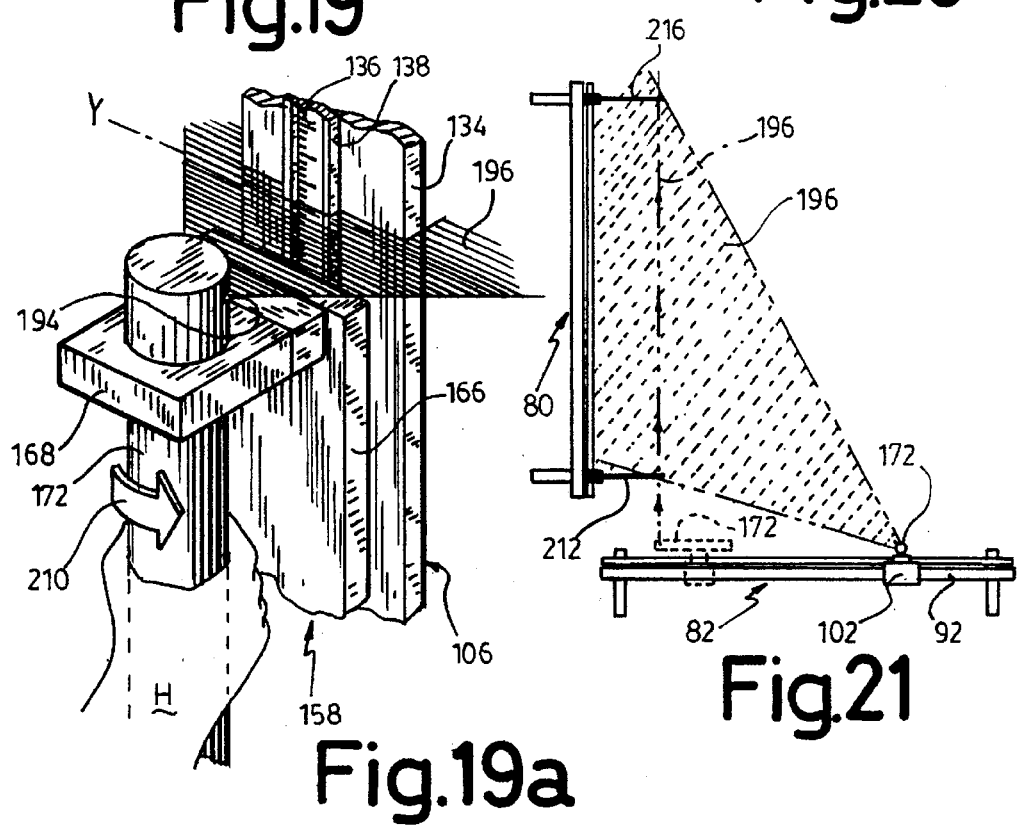

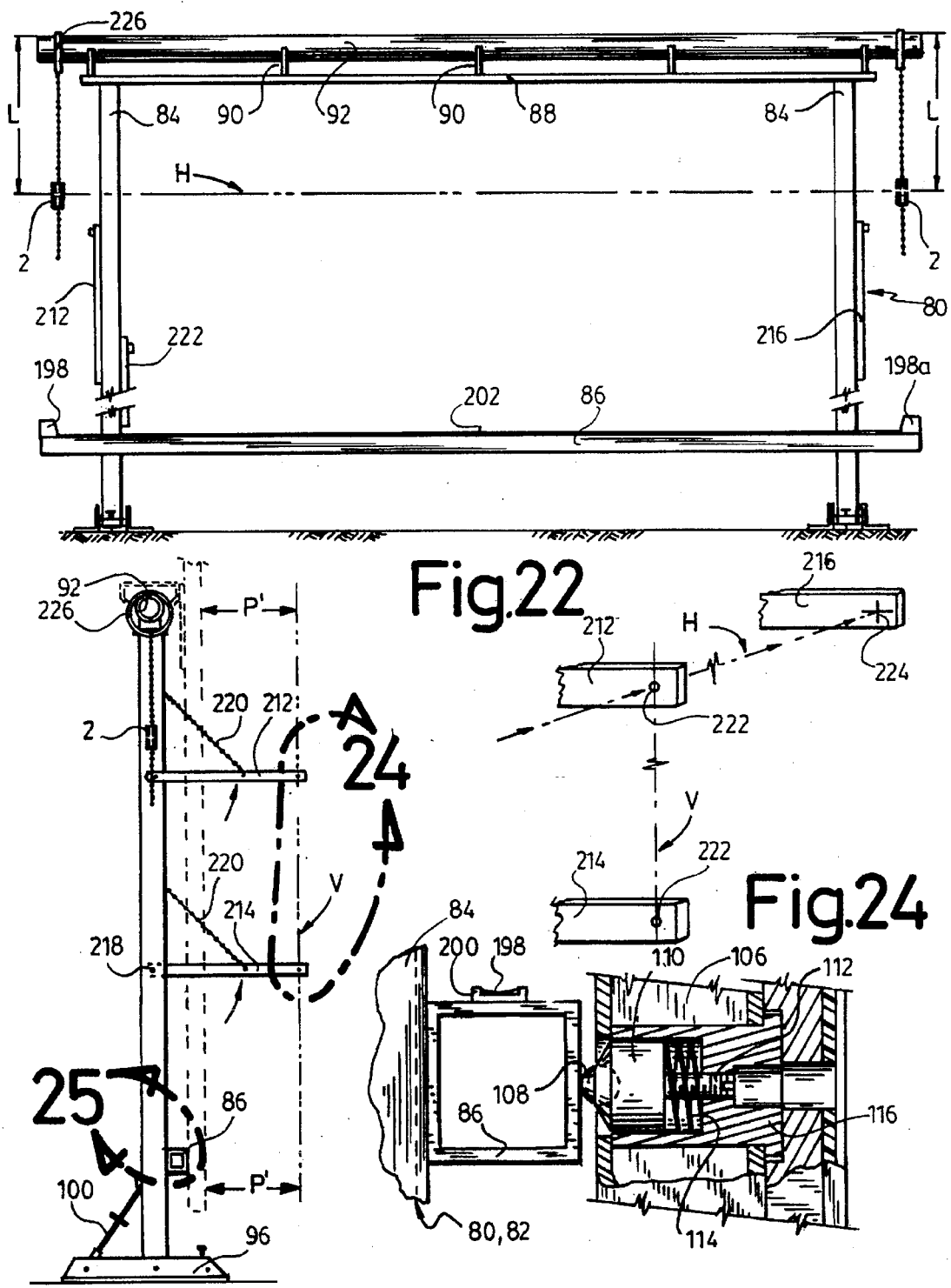

MEASURING DEVICE FOR VEHICLE BODY REPAIR

FIELD OF THE INVENTION

The present Invention relates to an apparatus for measuring the alignment of a vehicle body and its frame.

BACKGROUND OF THE INVENTION

When performing repairs to vehicular frames and their bodies, constant measuring is required prior to and when adjustments are made, to determine the extent to which the alignment of the vehicular body or frame deviates from the manufacturer's specification. Known devices for this purpose must be attached to the work bench supporting the vehicle being repaired or have parts overhanging or underlying the vehicle thus often impinging into the repairman's working area. Other measuring devices require complicated calculations often necessitating the use of computers. Most known devices are also not easily transportable and are thus required to remain for use with a specific work bench.

OBJECTS OF THE INVENTION

The general object of the present invention is to provide a measuring device of the character described which will obviate the above mentioned disadvantages.

A more specific object of the present invention is to provide a measuring device of the character described which is completely independent of the work bench on which the vehicle is mounted for repair, which does not obstruct the work of the repairman, and which is completely transportable so as to be either stored away when not in use or positioned in the working area of any work bench in the repair shop.

Another object of the present invention is to provide a measuring device of the character described which is of simple and inexpensive construction, requiring no precision parts and which can be easily positioned in a minimum of time in a proper measuring position around a vehicle.

Another object of the present invention is the provision of a device of the character described which can be used to measure inclined vehicle parts to bring them to the proper inclination during alignment work.

SUMMARY OF THE INVENTION

A measuring device comprises an upright frame adapted to be positioned along a vehicle to be repaired, target means adapted to be suspended from the vehicle underside to establish a generally horizontal datum plane underneath said vehicle, a laser support movably carried by said frame for movements in horizontal and vertical directions in a movement plane normal to said datum plane and substantially parallel or normal to the centre line of said vehicle, a laser supported by said laser support, a horizontal and a vertical scale supported by said upright frame in planes parallel to said movement plane, and laser beam orienting means operable in any position of said laser in said movement plane to selectively direct the laser beam emitted by said laser in a vehicle direction normal to said movement plane and in scale directions normal to said scales so that the position of the area of the vehicle illuminated by said laser beam can be measured on said scales as right angular coordinates of a selected reference point on said datum plane.

Preferably, the laser beam is a planar diverging beam and there are means to rotate the plane of the beam and to fix it at an adjusted angle.

Preferably, each scale is a tape which is supported in longitudinally adjusted position to bring the zero graduation of the tape in line with the reference point by using the laser whereby the coordinate points can be directly read on the scale without having to effect any substraction.

Preferably, the tape constituting the horizontal scale has two sets of graduations increasing in opposite directions from a common zero graduation.

For complete vehicle measurement, there are two upright frames disposed at right angles to each other, one frame parallel to the longitudinal center line of the vehicle, the other frame is normal to said center line across one end of the vehicle. There is provided a system for correctly positioning the two frames at precisely right angles to each other using the laser and also for positioning the frames with the measuring bars in a truly horizontal and vertical position respectively again using the laser.

Preferably, the same laser unit is alternately used on one frame and the other.

Preferably, each frame includes a lower horizontal measuring bar and an upper horizontal rail, a vertical travelling measuring rail is movable supported by a rail carriage on the upper horizontal rail, a laser carriage is movable along and carried by the vertical travelling rail, a laser support is rotatable in a vertical plane on the laser carriage, and an elongated cylindrical laser is carried by the laser support for rotation about its longitudinal axis. The laser emits a planar diverging laser beam normal to its longitudinal axis; the laser is rotatable so that the laser beam can be directed away from the frame to illuminate the vehicle or towards the measuring bar or the measuring rail.

The invention is also directed to improved constructions of the targets used to determine the datum plane under the vehicle serving as a reference for the coordinate points of the manufacturers specifications. Improved centering targets are also provided to facilitate longitudinal alignment of the car frame.

BRIEF DESCRIPTION OF THE DRAWINGS

FIG. 3 is an end view taken along line 3 of FIG. 2 and showing the specification targets and also the centering targets suspended from the underside of the vehicle;

FIG. 4 is a cross-section of one upright frame taken along line 4—4 of FIG. 1;

FIG. 5 is a partial elevation on an enlarged scale of the area in circle 5 of FIG. 4 and showing a portion of the vertical measuring rail, the laser carriage and its support together with the laser itself;

FIG. 6 is an enlarged partial cross-sectional elevation taken in area 6 of FIG. 4 and showing the horizontal top rail, the measuring rail carriage and the measuring rail suspended therefrom;

FIG. 7 is a partial elevation taken along line 7 of FIG. 4;

FIG. 8 is a cross-section taken along line 8—8 of FIG. 6;

FIG. 9 is a section taken along line 9—9 of FIG. 6;

FIG. 10, shown on the third sheet of drawings, is a partial elevation looking towards the left hand side of the mechanism shown in FIG. 5;

FIG. 11, shown on the fifth sheet of drawings, is a partial cross-section taken along line 11—11 of FIG. 10;

FIG. 12 is partial cross-section taken along line 12—12 of FIG. 8;

FIG. 13 is a cross-section taken along line 13—13 of FIG. 12;

FIG. 14 is a partial section taken along line 14—14 of FIG. 8;

FIGS. 15 and 15a are views taken along line 15—15 of FIG. 4 and showing the laser in horizontal and vertical positions respectively;

FIG. 16 is a cross-section taken along line 16—16 of FIG. 15;

FIG. 17 is a partial front view of one part of the laser support;

FIG. 18 is a plan section taken along line 18—18 of FIG. 15a and showing the laser support;

FIGS. 19 and 19a show two different positions of the laser and its support;

FIG. 20 is a partial perspective view of the lower measuring rail;

FIG. 21 is a schematic top plan view of the arrangement of the two upright frames and showing how the frames can be precisely positioned at right angles to each other and with their horizontal rail precisely horizontal using the laser;

FIG. 22 is a front elevation of one upright frame being aimed at by the laser mounted on the other frame;

FIG. 23 is an end view of the frame of FIG. 22 with the sighting arms in operative position;

FIG. 24 is a partial perspective view of the outer ends of the three sighting arms in operative position, this view taken in area 24 of FIG. 23;

FIG. 25 is a partial section taken in area 25 of FIG. 23;

DETAILED DESCRIPTION OF THE PREFERRED EMBODIMENT OF THE INVENTION

Figure 1:
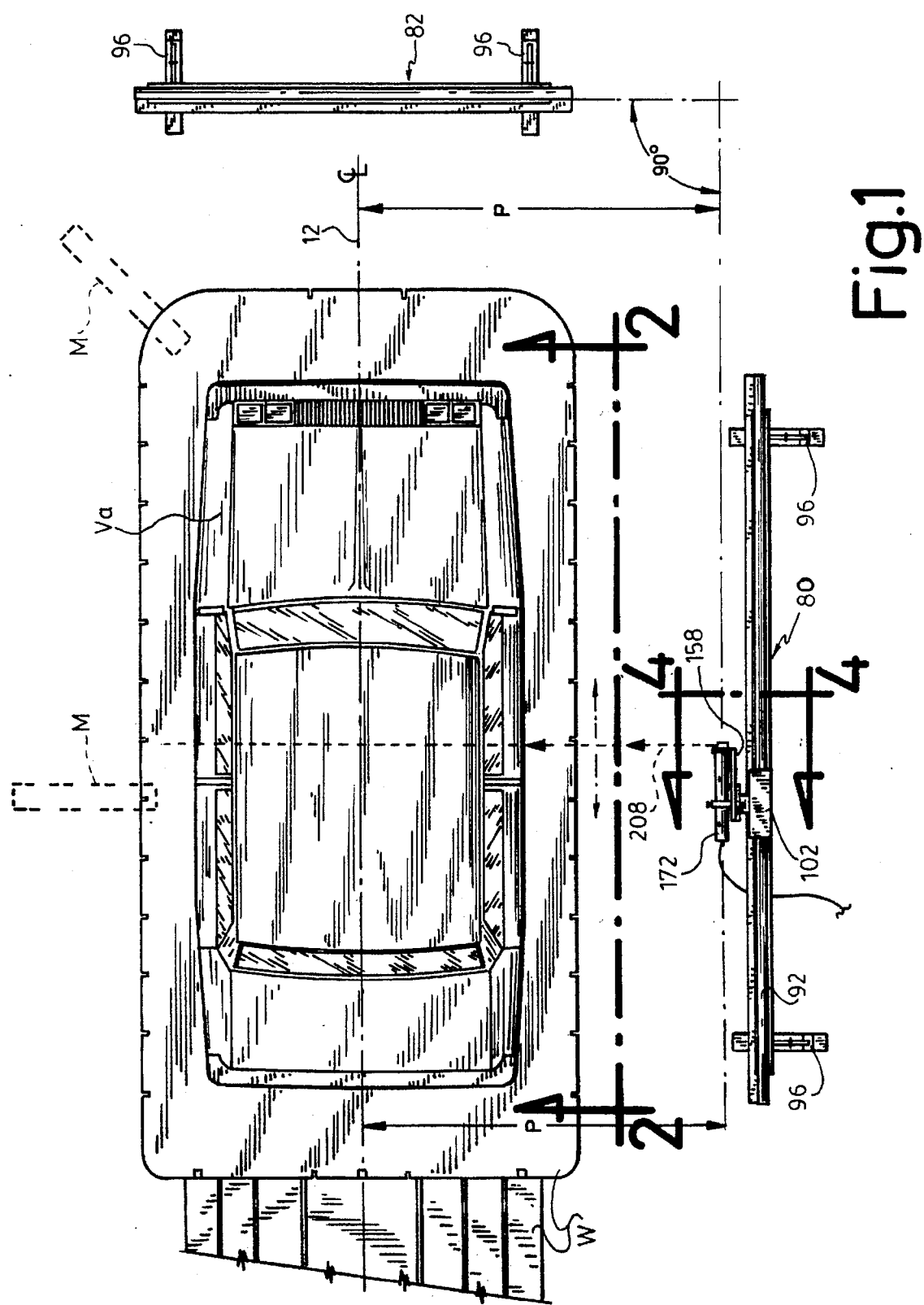
FIG. 1 is top plan view of the two upright frames of the measuring device of the invention in operative position with respect to a vehicle being repaired and the vehicle mounted on a work bench of conventional construction.
Figure 2:
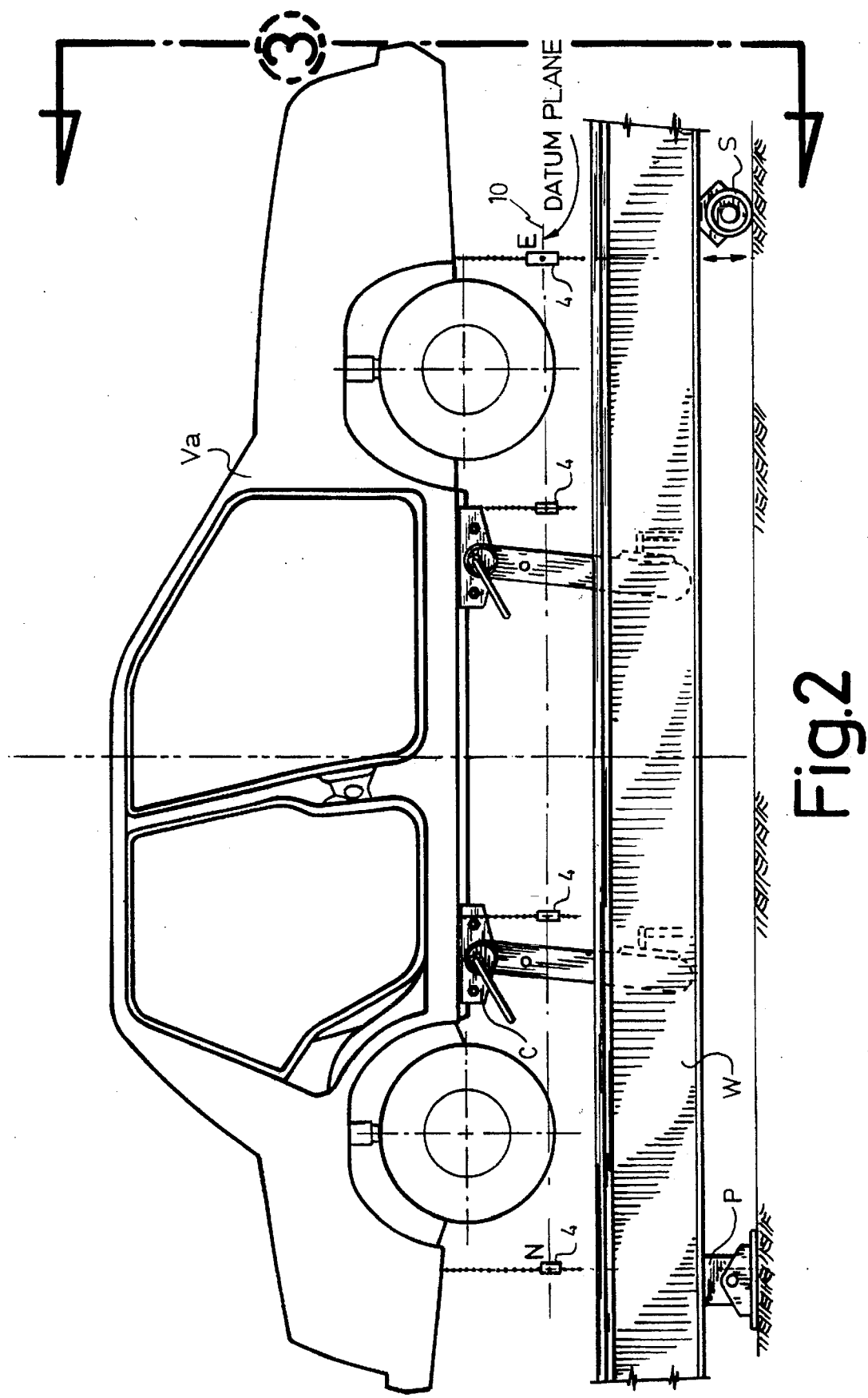
FIG. 2 is a side elevation taken along line 2—2 of FIG. 1 and showing the vehicle mounted on the work bench and the centering targets suspended from the vehicle and used for determining the vehicle center line and datum plane.

FIGS. 1, 2 and 3 show a vehicle Va to be repaired secured on top of a work bench W by means of clamps C. In the example shown, the work bench W can be adjusted to be horizontal by means of a pivot leg P and a cam system S. Clamps C are secured to the vehicle underbody. The work bench W and its vehicle mounting system is conventional and can be of any type. The work bench is used in combination with pulling members M shown in dotted line in FIG. 1 adapted to pull damaged part of the vehicle body at any desired orientation to bring the damaged part to the proper position in space as determined by the manufacturer's specifications.

In accordance with the invention, specification targets 2 and centering targets 4 are suspended from the vehicle, the structure of these targets being illustrated in FIGS. 26 to 33. Specifications targets 2 are to be suspended from the underside of the vehicle Va at manufacturer's coordinate points of such vehicle which are not damaged. Such coordinate points may be holes such as shown at 6 in FIG. 26 made in the underside panel 8 of the vehicle Va. Holes 6 or the like are given as manufacturer's coordinates of a datum plane 10 underneath the vehicle.

The coordinates are expressed as Y coordinates in the vertical direction and Z coordinates in the horizontal direction parallel to the vehicle center line 12 and X in the horizontal direction normal to the center line 12. The manufacturer's coordinate points of the hole 6 are thus given as X, Y and Z coordinates.

Figure 28:
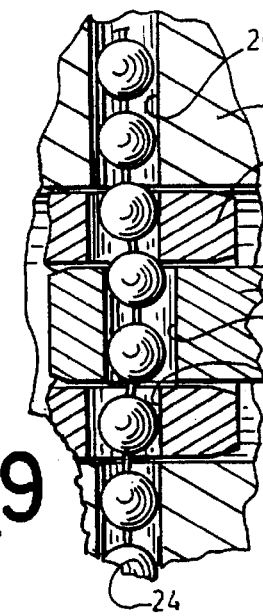
FIG. 28 is a partial cross-section of a target weight.

Each specification target 2 includes a clamp 14 comprising a pair of arms 16 pivoted to each other at 18 and forming at their upper ends outwardly extending hooks 20 to be engaged within a locating hole 6, the arms 16 are spring-loaded to open position of the hooks 20 by a spring 22. A ball chain 24 is attached at its upper end to the clamp 14 and extends through a central throughbore 26 of a target weight 28; oppositely directed springloaded push buttons 30 and 32 are transversely mounted of the weight 28. Push button 30 has a stem 34 having a perforation 36 which is disposed within the throughbore 26 and is aligned with the perforations 38 of a pair of flanges 40 slidable on stem 34 and which are part of the push button 30. When the two push button 30 and 32 are pressed towards each other against the action of the spring 42, the target weight 28 can be adjusted along the ball chain 24; when the push buttons are released perforations 36, 38 become out of alignment, as shown in FIG. 28, and the stem 34 and flanges 40 relock the chain in adjusted position within the target weight 28.

Figure 26:
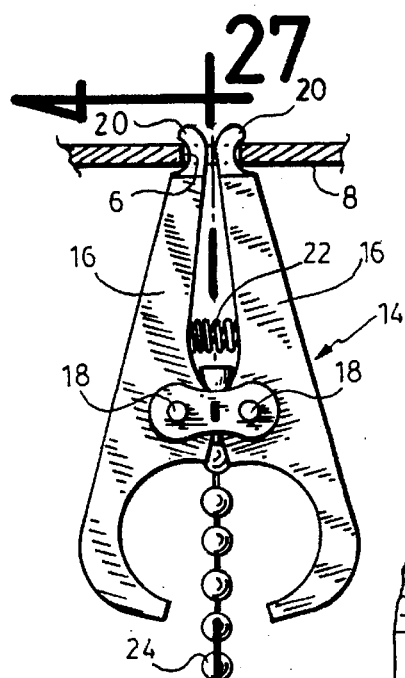
FIG. 26 is an elevation of a specification target in accordance with the invention, suspended from the car body partially shown in cross-section.
Figure 29A:
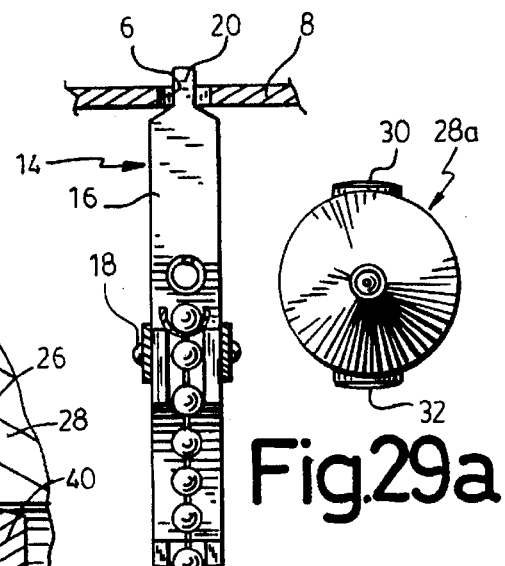
FIG. 29a is a similar view in accordance with a second embodiment.
Figure 29:
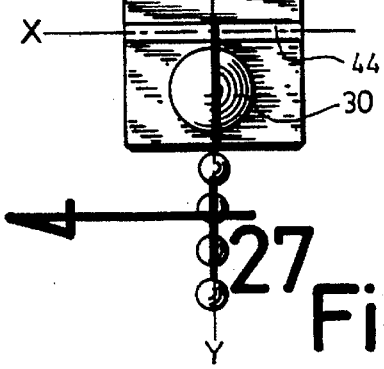
FIG. 29 is a top plan view of the target weight in accordance with one embodiment.
Figure 27:
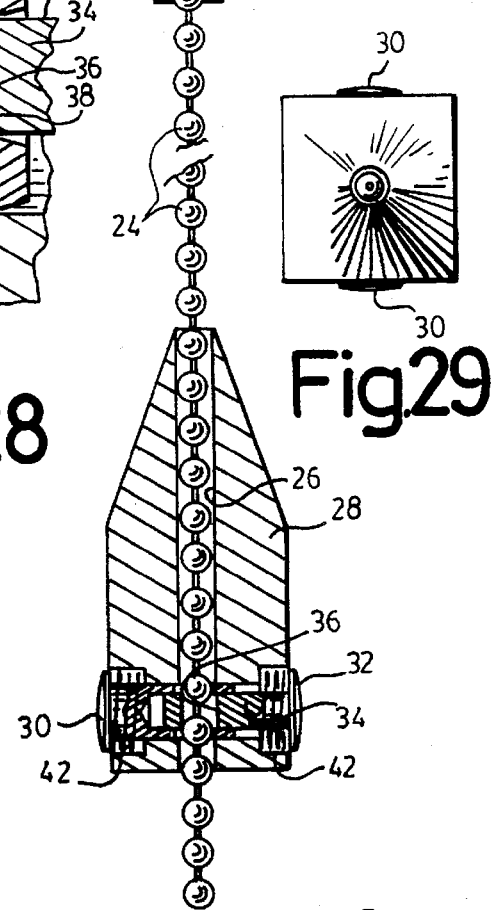
FIG. 27 is a longitudinal section taken along line 27—27 of FIG. 26.
Figures 30, 31:
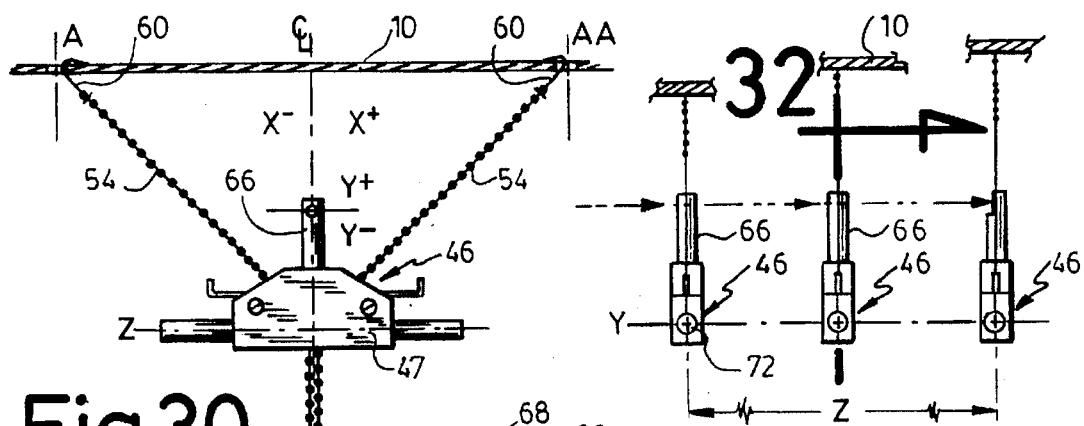
FIG. 30 is an elevation of a centering target shown attached to the underside of the vehicle, the bottom frame of which is shown in cross-section.
FIG. 31 is a side elevation of three centering targets in accordance with FIG. 30.

The target weight 28 may be foursided as shown in FIGS. 26, 27 and 29 or be totally cylindrical as shown in FIG. 29a. Each side face is provided with target indiciae in the form of a cross defined by the chain 24 and a horizontal groove 44 made in each side face of the target weight.

The centering targets 4 are shown in FIGS. 30 to 33; each centering target 4 comprises a block 46 made of block sections 47 secured together by bolts 47a and defining a Y-shaped throughbore 48 consisting of a common lower vertical bore 50 communicating with two upwardly diverging upper bores sections 52. A pair of ball chains 44 are inserted through the throughbore 48, the balls of the ball chain being interdigitated within the lower vertical bore section 50 and the two chains extending and diverging through the respective upper bore sections 52.

Figure 32:
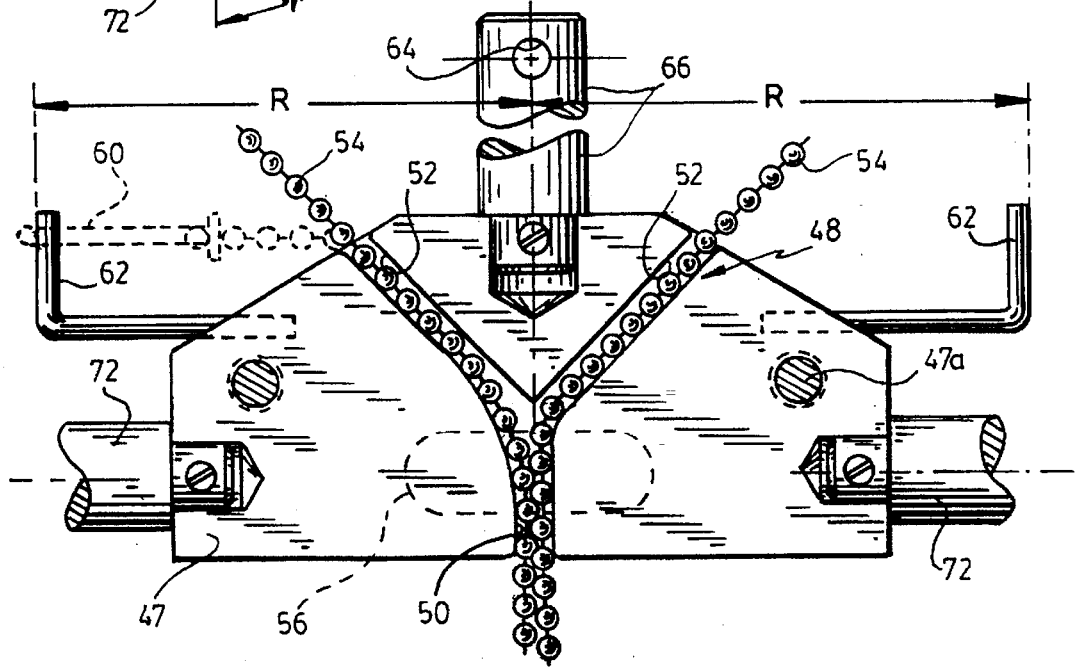
FIG. 32 is a front view of one centering target taken line 32—32 of FIG. 31.

The relative longitudinal position of the two ball chains 54 can be adjusted by pulling on one chain or the other against the compression action of an elastomeric block 56 which is held across lower bore 50 between the two sections 47 of the block 46 and which engages the two ball chains 54 as shown in dotted line in FIG. 32. Each chain has a hook 60 at its top end engageable with one of the holes 6 serving as manufacturer's coordinate points. L-shaped gauge rods 62 are fixed to the block 46 and protrude laterally on opposite sides thereof and are adapted to be engaged by the hook 60 so that the ball chains 54 may be adjusted to have top chain sections of equal length so that the block 46, when suspended from a pair of holes 6 having equal X coordinates on opposite sides of the vehicle center line 12, will be centered on this center line 12.

If the vehicle body in the areas of some coordinate point holes 6 are damaged, the centering targets 4 will be displaced from the center line either horizontally or vertically. Alignment of the vehicle frame through the work bench tools will be easily achieved by directing the laser beam of the laser based measuring system of the invention through the sighting holes 64 of the upright central sighting rods 66 mounted on block 46 of the nearer targets 4 and onto, a target sight 68 on the sighting rod 66 of the farthest target 4.

Figure 33:
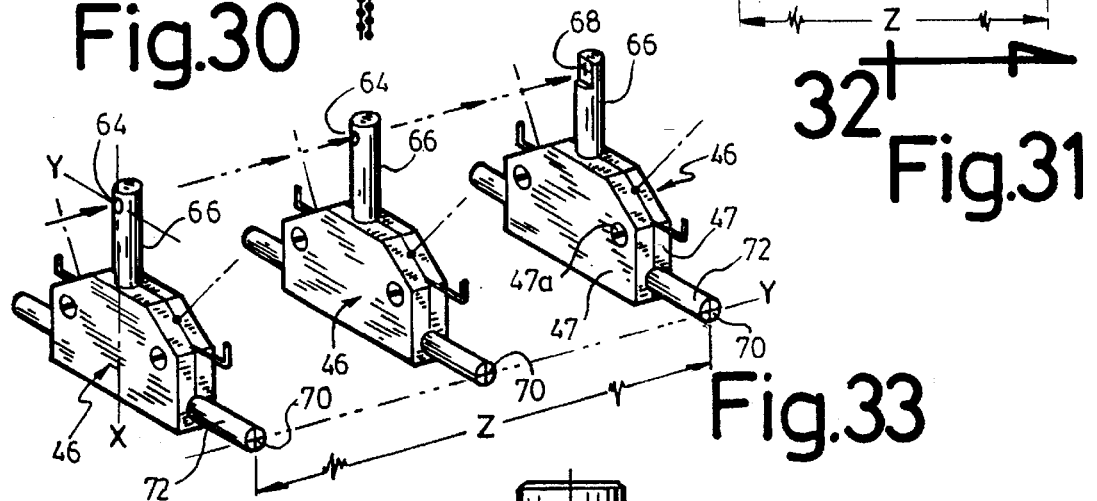
FIG. 33 is a perspective view of three centering targets showing how they are used to align the vehicle frame in the direction of its center line.

Referring to FIG. 33 supposing the intermediate target 4 is out of alignment, the vehicle body will be aligned in the right direction until the laser beam extends through the sighting bore 64 of this intermediate target. When the vehicle frame is properly aligned, a laser beam directed along the center line of the vehicle will go through all the holes 64 and hit or illuminate the sighting target 68 of the last centering target of the series. Normally four centering targets are suspended from the vehicle along the center line of the same.

Each block 46 is also provided with laser targets 70 on the ends of a pair of oppositely directed horizontal sighting rods 72. All laser targets 70 on one side of blocks 46 will be illuminated by a horizontal laser beam when the targets are all on the same horizontal plane. This permits to correct misalignment of the vehicle frame in the vertical direction.

The measuring system further comprises a first upright frame 80 disposed alongside the vehicle Va generally parallel to the center line 12 and at any appropriate distance as shown by P in FIG. 1, out of the way of the body shop workmen. A second upstanding frame 82 similar to the first one is arranged at an end of the vehicle Va spaced from the work bench and disposed generally normal to the center line 12. Frame 80 will be described together with its accessories, frame 82 and its accessories being the same except that frame 82 is shorter as shown in FIG. 1.

Referring to FIGS. 1 and 4 to 23, upstanding frame 20 includes a pair of uprights 84 rigidly interconnected by a horizontal, lower, measuring bar 86 and a top horizontal member 88 supporting by spaced brackets 90 a tubular, top, horizontal rail 92. The lower end of each post is pivoted at 94 to a transverse base 96 which can be adjusted to be set at the horizontal by an adjustment screw 98. Each upright 84 is braced by a length adjustable brace 100 (see FIGS. 4 and 7) which interconnects the rail end of each transverse base 96 to the upright 84 and thus the frame 80 can be roughly positioned in a vertical plane by the adjustment screws 98 and braces 100.

A rail carriage 102 carries a set of guiding wheels 104 set at 45° and which rest on the horizontal tubular rail 92. A vertical, travelling, measuring rail 106 has its upper end portion fixed to the rail carriage 102 while its lower end abuts against the lower measuring bar 86. Measuring rail 106 can be vertically adjusted with respect to the frame 80 by the means shown in FIG. 25. A ball bearing 108 abuts against and rolls on the measuring bar 86, this ball bearing 108 is set in a carrier 110 movable in a bore 114 of a plug 116 towards and away from bar 86 by means of an adjustment screw 112 which is threaded within plug 116 secured to rail 106.

As shown in FIGS. 6, 8, 12, 13 and 14, the upper portion of the vertical measuring rail 106 is pivotally secured to the rail carriage 102 by means of a pivot 118 so that the rail 106 can be vertically adjusted in the plane of the frame 80 in accordance with double arrow 120 in FIG. 8, through an adjustment screw 122 operated by a knob 124. Screw 122 is threaded through a block 126 fixed to an adaptor 127 secured to a square tube 128 which forms part of the measuring rail 106. A compression coil spring 130 surrounds screw 122 and abuts against the block 126 and against a bracket 132 fixed to the carriage 102. Spring 130 biases knob 124 against the opposite side of bracket 132; rotation of screw 122 by knob 124 causes block 126 to move and consequently rail 106 to pivot in accordance with double arrow 120.

Measuring rail 106 is composed of a guide plate 134 which is secured to one side of the cross-sectionally square tube 128. A measuring tape 136 is carried by the face of guide plate 134 facing away from frame 80. This measuring tape is longitudinally slidable in a guide 138 which is fixed to guide plate 134 and is extended from a standard tape casing 136a fixed to the upper end of rail 106.

A laser carriage 140 is slidably guided along guide plate 134; laser carriage 140 includes a rectangular plate 142 to which is secured vertical, grooved strips 144 which slidably receives the edges of guide plate 134. Thus laser carriage is guided for up and down movement on the vertical measuring rail 106. The vertical position of the laser carriage 140 on the rail 106 can be adjustably locked by a rack and pinion system (not shown) or by the following means (see FIGS. 4, 6 and 11): a cable 146 extends alongside rail 106, being attached to the top of the rail at 148 and to the bottom of the rail at 150. Cable 146 is trained around a pair of idle wheels 152 carried by a bracket 154 secured to one of the grooved strips 144 (see FIG. 11). One of said idle wheels can be tightened against rotation by screwing its knob 156 against bracket 154.

The laser support 158 is pivoted about a pivot bolt 160 for rotation in a vertical plane with respect to the laser carriage 140. The pivot bolt 160 protrudes from and is fixed to the rectangular plate 142. The laser support includes an indexing plate 162 carrying a series of indexing holes 164 set at 15° intervals with respect to the axis of pivot bolt 160 as shown in FIG. 17. The laser support further includes an elongated bracket 166 also pivoted on bolt 160 and including right angular flanges 168, 170 which are spaced from each other. A cylindrical laser 172 is mounted within the flanges 168, 170.

Referring to FIGS. 15 and 16, one end of the laser 172 is rotatably and slidably fitted within a circular hole of flange 168 while the other end of the laser is rotatably mounted in collar 174 which, in turn, is guided in an elongated opening 176 of flange 170 for adjustable positioning in accordance with double arrow 178 towards or away from elongated bracket 166 through an adjusting set screw 180 counteracted by a compression spring. Thus the longitudinal axis of the laser 172 can be adjusted to be parallel with the plane of rotation of the elongated bracket 166 and indexing plate 162 on the rectangular plate 142.

A spring loaded plunger 184 (see FIGS. 17 and 18) is used to engage a selected one of the indexing holes 164 to adjust the angular orientation of the laser in a vertical plane with a precision of 15°. The laser can be thus positioned in a vertical direction as shown in FIG. 15a extending alongside the vertical travelling measuring rail 106, in a horizontal position as shown in FIG. 15 extending across the rail 106 or in any inclination.

There is also provided a micrometric adjustment of the angular position of the laser which comprises a pair of oppositely directed set screws 186, threaded in a pair of spaced arms 188 which laterally extends from the rectangular plate 142. The set screws 186 engage opposite sides of a stop arm 190 which is integral with and laterally protrudes from indexing plate 162; therefore, indexing plate 162 can be adjustably rotated in a precise manner with respect to the rectangular plate 142 so as to more precisely orient the laser in a vertical plane within about +/−3° in intermediate positions between the indexing positions defined by the indexing holes 164.

A degree scale (not shown) is inscribed in the lower portion of the rectangular plate 142 for appearing through an indexing window 192 made in the lower portion of the indexing plate 162. laser 172 is of the type having a lateral slit 194 at one end through which a planar diverging laser beam 196 is emitted in a plane at right angles to the longitudinal axis of the laser 172. The laser beam defines an arc of about 45°. A preferred type of laser emitting such a laser beam is sold under the registered trademark LASALIGN.

As shown in FIG. 20, the measuring bar 86 carries a pair of measuring tapes 198, 198' which are both slidably and adjustably positioned for longitudinal adjustment within a guide 200 fixed to the top of the measuring bar 86 and extending longitudinally thereof throughout its length. The zero graduation of both tapes 198 is indicated by the zero graduation flanges 202, 202' which abut each other, said tabs commonly found on conventional measuring tapes 198, their casings 198a are fixed to opposite ends of bar 86 (see FIGS. 4 and 7). Therefore the graduations of the two tapes 198, 198' increases in opposite drections.

The zero graduation of the measuring tape 136 which is fixed to and is adjustably positioned on the vertical measuring rail 106, is positioned at the lower end of said measuring rail.

As shown in FIG. 19, laser 172, while supported in horizontal position, can be rotated by the operator's hand shown at H about its longitudinal axis in accordance with arrow 206 so that its laser beam 196 can be directed onto the measuring tapes 198, 198' to take a reading thereof or onto the vehicle Va in accordance with arrow 208 in FIG. 1 to illuminate, as a thin vertical line, a selected area of a vehicle. Therefore, in practice, the position of this selected area can be directly read as a plus or minus Z coordinate starting from a zero scale reference point on one coordinate starting from a zero scale reference point on one or the other of measuring tapes 198, 198' by a simple rotation of the laser in accordance with arrow 206. Without displacing the vertical measuring rail 106, the laser 172 and its support 158 are rotated in a vertical plane about pivot 160 to the vertical position of FIG. 19a with laser beam 196 now in a horizontal plane. The laser is rotated by the operator's hand in accordance with the arrow 210 first to direct the laser beam onto the vehicle as a horizontal line which by adjusting the vertical position of laser support 158 is brought to hit the vehicle area where the Z coordinate was first taken and the laser is then rotated so that the laser beam illuminates the vertical measuring tape 136 to take a reading of the corresponding Y coordinate.

Before taking readings of the X-Z coordinates in this manner, it is noted that the vertical measuring tape on the vertical measuring rail 106 was longitudinally shifted so that its zero graduation will be set at the same level as the datum plane 10. This operation is effected by directing horizontal laser beam 196 on the targets 2; when the laser beam is at appropriate level, it is rotated in accordance with arrow 210 onto the vertical measuring tape 136 and the latter is shifted to bring its zero graduation in the position illuminated by the laser beam.

The same operation is effected to bring the two zero graduations 202, 202' of the horizontal measuring tapes 198, 198' in alignment with a zero reference point at the middle of vehicle Va, as seen in FIG. 2 and obtained in accordance with the manufacturer's specifications again using the specification targets 2. With the zero graduations of both the horizontal and vertical scales properly adjusted as above described, the readings of the Z and Y coordinate points of the vehicle can be directly read on the measuring scales without having to effect addition or substraction calculations thus rendering the measuring work especially easy for the workman.

The second upstanding frame 82 as shown in FIG. 1, is of the same construction as the first frame 80 except that it is shorter.

Only one laser supporting assembly is preferably used to be installed on one or the other of the two frames 80, 82. Obviously, if so desired, a laser assembly could be used in association with each upstanding frame 80 and 82.

A laser assembly includes carriage 102 with its wheels 104, rail 106, laser support 158 and laser 172.

The two frames 80, 82 must be set at precisely 90°, one with respect to the other as shown in plan view in FIG. 1. To achieve this perpendicularity, laser 172 is used in conjunction with three sighting arms 212, 214 and 216 as shown in FIGS. 21 to 24. Sighting arms 212 and 214 are pivoted one below the other at 218 on the upright 84 of upstanding frame 80 which is nearer the frame 82. A third sighting arm 216 is similarly pivoted at 218 on the upright 84 of upstanding frame 80 which is farther away from upstanding frame 82. The three sighting arms 212, 214 and 216 simply hang alongside the uprights when not in use and are retained by a detachable chain 220 in horizontal position when in use. In this operative position, their outer ends are directed towards the vehicle Va; a sighting hole 222 is made through the outer end of each sighting arm 212, 214 while a target marking 224 is inscribed on the outer end of sighting arm 216. The holes 222 and target marking 224 are equally distant from the center line of the uprights 84.

Specification targets 2 can also be hung from the top rail 92 of the upstanding frame 80 by means of rings 226 as shown in FIGS. 22,23.

Referring to FIGS. 15 and 16, the adjustment of the laser 172 and in support bracket 166 by means of the adjustment screw 180 is normally carried out at the manufacturing plant of the device of the invention. This adjustment is effected so as to obtain that the longitudinal axis of the laser 172 be coplanar with its movement plane in its X-Y direction or in its Z-Y direction.

In the body workshop, the vehicle frames 80 and 82 are positioned as follows. First the frame 82 is set up, for instance at the front end of the vehicle as shown in FIG. 1, with its uprights 84 generally vertical and with its measuring bar 86 normally horizontal using a level to do so and using the adjustment screws 98 on the base 96 together with the adjustable braces 100. Four centering targets are suspended from the underside of the vehicle using the manufacturers coordinate points. The laser beam assembly is mounted on the top rail 92 of the frame 82. Laser 172 is rotatably adjusted so as to direct a vertical laser beam onto the centering targets 2. Normally at least two of the four such targets will hang from undamaged parts of the vehicle including the target with the sighting sign 68. When the laser beam goes through the holes 64 and reaches the sign 68, this means that the frame 82 is truly at right angles to the center line 12 of the vehicle. The two measuring tapes 198, 198' of the frame 82 are then longitudinally shifted so as to bring their zero graduation denominated by tabs 202, 202' in alignment with the vehicle center line simply by rotating the laser 172 in accordance with arrow 206 to bring the vertical laser beam 196 onto the tapes 198 (see FIG. 19).

Proper positioning of the frame 82 is then completed, frame 80 is then placed in its intended general position parallel to the vehicle center line 12, and using a level, adjusted to lie in a vertical plane with its measuring bar 86 generally horizontal.

Refering to FIGS. 22 to 24, the targets 2 are hung by rings 226 from the top rail 92 and a horizontal laser beam is directed from the frame 82 to hit the two targets 2 as shown in FIG. 21 by adjusting set screws 98. The sighting arms 212, 214 and 216 are then pivoted down to operative position and the vertical laser beam is directed through the sighting holes 222, the vertical laser beam will hit the target 224 when frame 80 has been adjusted to be truly perpendicular to frame 82.

Using the coordinate point targets 2 suspended on the underside of the vehicle, the vertical tape on the vertical measuring rail 106 is longitudinally shifted to bring its zero graduation in horizontal alignment with the datum plane 10 as previously described. This is also effected for frame 82. The measuring tapes 198 on the frame 80 are also shifted so as to bring its zero position in alignment with a vehicle center reference point chosen in accordance with the manufacturer's specifications and as indicated by arrow 208 in FIG. 1.

As previously mentioned, any points on the vehicle body can be directly measured on the measuring tapes either in the Z-Y direction or X-Y direction. Also, referring to FIG. 3, by adjusting the vertical orientation of the laser beam in accordance with the manufacturer's specifications, the divergent planar laser beam can be used to align inclined body parts such as the windshield frame as indicated by angle alpha, or the wheel camber and other inclined parts of the vehicle to be repaired.

I claim:

1. A measuring device for use in vehicular repair comprising an upright frame adapted to be positioned along a vehicle to be repaired, target means adapted to be suspended from the vehicle underside to establish a generally horizontal datum plane underneath said vehicle, a laser support movably carried by said frame for movements in horizontal and vertical directions in a movement plane normal to said datum plane and substantially parallel or normal to the centre line of said vehicle, a laser supported by said laser support, a horizontal and a vertical scale supported by said upright frame in planes parallel to said movement plane, and laser beam orienting means operable in any position of said laser in said movement plane to selectively direct the laser beam emitted by said laser in a vehicle direction normal to said movement plane and in scale directions normal to said scales so that the position of the area of the vehicle illuminated by said laser beam can be measured on said scales as right angular coordinates of a selected reference point on said datum plane; wherein each scale is a tape with graduations starting at a zero graduation and further including means to support said tapes in longitudinally adjusted positions to bring by means of said laser beam said zero graduation in line with said reference point.

2. A measuring device as claimed in claim 1, wherein said laser beam is a planar, diverging beam and further including means to rotate the plane of said beam and means to fix the plane of said beam at an adjusted angle.

3. A measuring device as defined in claim 2, wherein the graduations of said tape constituting said horizontal scale includes two sets of graduations increasing in opposite directions and having a common zero graduation.

4. A measuring device for use in vehicular repair comprising an upright frame adapted to be positioned along a vehicle to be repaired, target means adapted to be suspended from the vehicle underside to establish a generally horizontal datum plane underneath said vehicle, a laser support movably carried by said frame for movements in horizontal and vertical directions in a movement plane normal to said datum plane and substantially parallel or normal to the centre line of said vehicle, a laser supported by said laser support, a horizontal and a vertical scale supported by said upright frame in planes parallel to said movement plane, and laser beam orienting means operable in any position of said laser in said movement plane to selectively direct the laser beam emitted by said laser in a vehicle direction normal to said movement plane and in scale directions normal to said scales so that the position of the area of the vehicle illuminated by said laser beam can be measured on said scales as right angular coordinates of a selected reference point on said datum plane; wherein said upright frame is a first upright frame adapted to be positioned along a side of said vehicle, said laser support is a first laser support and its movement plane is parallel to the centre line of said vehicle, and said scales are first scales, and further including a second upright frame adapted to be positioned across an end of said vehicle normal to said first frame; a second laser support movably carried by said second frame for movements in horizontal and vertical directions in a movement plane normal to said datum plane and normal to said centre line, a second horizontal scale and a second vertical scale supported by said second frame in positions and in planes parallel to said movement plane of said second laser support, said second laser support adapted to support a laser emitting a laser beam and second laser beam orienting means operable in any position of said second laser support in its movement plane to selectively direct the laser beam of the laser supported by said second support in a vehicle direction normal to said last-named movement plane, and in scale directions normal to the respective second scales so that the position of an area of the vehicle illuminated by the laser supported by said second laser support can be measured on said second scales as right angular coordinates of a reference point located on said datum plane.

5. A measuring device as defined in claim 4, wherein the laser beam of the laser supported by said second laser support is a planar diverging beam and further including means to rotate the plane of said last-named laser beam and means to fix the plane of said last-named laser beam at an adjusted angle.

6. A measuring device as defined in claim 4, wherein each second scale is a tape with graduations starting at a zero graduation and further including means to support said last-named tapes in longitudinally adjusted positions to bring, by means of the laser beam of the laser supported on said second laser support, said zero graduation in line with said reference point.

7. A measuring device as defined in claim 6, wherein the graduations of the tape constituting said second horizontal scale includes two sets of graduations increasing in opposite directions and having a common zero graduation.

8. A measuring device as defined in claim 4, further including means to horizontally and vertically adjust said first and second horizontal and vertical scales respectively and means to adjust the mutual perpendicularity of said first and second frames.

9. A measuring device for use in vehicular repairs comprising an upright frame adapted to be positioned along a vehicle to be repaired, said upright frame including a lower horizontal measuring bar and an upper horizontal rail, a vertical, travelling measuring rail movably supported by said horizontal rail, a laser carriage movable along said vertical travelling rail, a laser support rotatable in a vertical plane on said laser carriage, said laser support moveable vertically and horizontally in a movement plane parallel to said frame by moving said laser carriage along said vertical rail and by moving said vertical rail along said upper, horizontal rail, an elongated laser carried by said laser support and emitting a planar diverging laser beam normal to the longitudinal axis of said laser, said laser rotatable in said laser support about its longitudinal axis so that said laser beam can be directed away from said frame to illuminate said vehicle or towards said measuring bar or said measuring rail whereby said laser can be positioned anywhere in said movement plane, said laser support can be rotated on said laser carriage so that said laser beam can illuminate said vehicle either as a horizontal or a vertical linear ray and said laser beam, when illuminating a specific linear zone of said vehicle can be rotated in said laser support to illuminate a graduation of said measuring rail when said beam is horizontal or a graduation of said measuring bar when said beam is vertical.

10. A measuring device as defined in claim 9, further including a first and a second measuring tapes slidably carried by said horizontal measuring bar and by said vertical measuring rail respectively for adjustably positioning said tapes longitudinally of said measuring bar and measuring rail respectively.

11. A measuring device as defined in claim 10, wherein the scale graduations of said first measuring tape increase in opposite directions and have a common zero graduation.

12. A measuring device as defined in claim 11, further including a rail carriage movable on said upper horizontal rail, the upper end of said vertical travelling measuring rail fixed to and depending from said rail carriage in cantilever fashion and resting against a side of said lower measuring bar and further including an abutment carried by the lower end of said vertical measuring rail and adjustably abutting said measuring bar to adjust the verticalness of said vertical measuring rail.

13. A measuring device as defined in claim 12, wherein said laser includes a cylindrical body and said laser support includes two brackets having circular holes in which the end portions of said laser body are inserted for rotation of said laser about its longitudinal axis, said laser body having at one end a lateral slit normal to said axis and through which said laser beam is emitted in a plane normal to said axis, rotation of said laser body in said brackets permitting to selectively direct said laser beam towards said vehicle and toward any of said scales.

14. A measuring device as defined in claim 13, further including means to adjustably fix said laser support on said laser carriage at a number of predetermined angular positions, and micrometric means to further precisely adjust the angular position of said laser support intermediate said predetermined angular positions.

15. A measuring device as defined in claim 13, further including means to adjustably position said laser carriage at a selected vertical position along said vertical travelling measuring rail.

16. A measuring device as defined in claim 11, further including a second upright frame adapted to be positioned along said vehicle at right angles to said first named upright frame, said second upright frame including a second lower horizontal measuring bar and a second upper horizontal rail and further including a second vertical travelling measuring rail movably supported by said second upper horizontal rail, a second laser carriage movable along said second vertical travelling rail, a second laser support movable horizontally and vertically in a second movement plane parallel to said second frame and rotatable in a vertical plane on said second laser carriage for rotatably supporting said laser in said second laser support for rotation about the longitudinal axis of said laser so that the laser supported by said second laser support can selectively illuminate the vehicle and the graduations of said second measuring bar and of said second measuring rail.

17. A measuring device as defined in claim 16 and further including means to adjust the perpendicularity of said first and second upright frames so that the movement planes of said first and second laser supports are normal to each other.

18. A measuring device as defined in claim 17, wherein said last-named means includes a pair of arms pivoted to opposite ends of one of said upright frames between a position alongside said frame and a position projecting at right angles to said frame, the outer end of one of said arm having a sighting hole and the outer end of the other arm having a sighting target adapted to be illuminated by a laser carried by the laser carriage of the other upright frame with the laser beam in a vertical plane.

* * * * *